United States Patent
Jung et al.

(10) Patent No.: US 9,024,577 B2
(45) Date of Patent: May 5, 2015

(54) NON-CONTACT AND CONTACT POWER CHARGING DEVICE AND CONTROLLING METHOD THEREOF

(75) Inventors: Chun-Kil Jung, Seoul (KR); Yoon-Sang Kuk, Gwacheon-si (KR)

(73) Assignee: Hanrim Postech Co., Ltd., Suwon-Si (KR)

( * ) Notice: Subject to any disclaimer, the term of this patent is extended or adjusted under 35 U.S.C. 154(b) by 389 days.

(21) Appl. No.: 13/493,479

(22) Filed: Jun. 11, 2012

(65) Prior Publication Data
US 2012/0313578 A1    Dec. 13, 2012

(30) Foreign Application Priority Data
Jun. 10, 2011   (KR) .................. 10-2011-0056460

(51) Int. Cl.
*H02J 7/00* (2006.01)
*H02J 7/02* (2006.01)
*H02J 5/00* (2006.01)

(52) U.S. Cl.
CPC ............... *H02J 7/0047* (2013.01); *H02J 7/007* (2013.01); *H02J 7/025* (2013.01); *Y02B 60/50* (2013.01); *H02J 5/005* (2013.01)

(58) Field of Classification Search
CPC . H02J 7/025; H02J 2007/0062; H02J 7/0044; Y02B 40/90; H04B 5/0031; H04B 5/0037
USPC ........................... 320/108, 137, 106, 107, 109
See application file for complete search history.

(56) References Cited

U.S. PATENT DOCUMENTS

| 2009/0021219 A1* | 1/2009 | Yoda et al. ................ 320/137 |
| 2009/0261778 A1* | 10/2009 | Kook ........................ 320/108 |
| 2012/0043807 A1* | 2/2012 | Ichikawa .................... 307/9.1 |

FOREIGN PATENT DOCUMENTS

| CN | 101399383 A | 4/2009 |
| KR | 20-0415537 | 5/2006 |
| KR | 10-2008-0094468 A | 10/2008 |
| KR | 10-0903462 | 6/2009 |
| KR | 10-2009-0117295 A | 11/2009 |
| KR | 2009-0117295 | 11/2009 |

OTHER PUBLICATIONS

Korean Office Action, Jun. 25, 2012, Issued in corresponding Korean Patent Application (KR 10-2011-0056460).
Chinese Office Action issued Jul. 2, 2014, issued to corresponding Chinese Patent Application No. 201210191925.X.

* cited by examiner

*Primary Examiner* — Brian Ngo
(74) *Attorney, Agent, or Firm* — Stein IP, LLC

(57) ABSTRACT

A non-contact-contact power charge device, and a controlling method thereof, includes: a charge contact terminal including a charge output voltage pin, a ground pin, and a non-contact charge connection pin, the charge contact terminal being able to connect to a contact power receiver and a non-contact power transmitter; and a voltage controller configured to apply a non-contact voltage to the charge output voltage pin if the charge contact terminal is connected while the non-contact power transmitter is contacted to the non-contact charge connection pin.

16 Claims, 4 Drawing Sheets

NON-CONTACT AND CONTACT POWER CHARGING DEVICE AND CONTROLLING METHOD THEREOF

CROSS-REFERENCE TO RELATED APPLICATION

This application claims the benefit of Korean Patent Application No. 10-2011-0056460, filed on Jun. 10, 2011 in the Korean Intellectual Property Office, the disclosure of which is incorporated herein by reference.

BACKGROUND OF THE INVENTION

1. Field of the Invention

The following description relates to a non-contact-contact power charge device that is used for both of a non-contact power transmitter employing a non-contact charge method and a contact power receiver employing a contact charge method, and a controlling method thereof.

2. Description of the Related Art

Generally, a battery pack received the electric power from an external charging device and supplies the power for operating a portable terminal including a mobile phone and Personal Digital Assistant (PDA) in a charged state. The battery pack includes a battery cell for charging the electric energy and a circuit for charging and discharging the battery cell (i.e., supplying the electric energy to a portable terminal). A method of electrically connecting the battery pack and the charging device for charging the electric energy to the battery pack used in the portable terminal includes a terminal supplying method. The terminal supplying method includes receiving the commercial electricity, converting the commercial electricity into a voltage and a current corresponding to the battery pack, and supplying the electric energy to the battery pack via the terminal of the corresponding battery pack.

However, when power is supplied by the terminal supplying method, there is a problem that an instantaneous discharge phenomenon occurs since both terminals of the battery pack and the charging device have different potential differences when the charging device and the battery pack are in contact with or are separated from each other. Particularly, when foreign objects are stacked up on both terminals due to the instantaneous discharge phenomenon, a fire may break out. There are also problems that the electric energy charged in the battery pack is naturally discharged to an outside via the terminal of the battery pack due to moisture to cause reduction of a lifespan and deterioration of performance of the battery pack.

Recently, controlling methods and charging systems of a non-contact type using a wireless power transmission method have been suggested to solve the above-mentioned problems.

SUMMARY OF THE INVENTION

While not limited thereto, an embodiment of the invention provides a non-contact-contact power charge device that is used for both of a non-contact power transmitter employing a non-contact charge method and a contact power receiver employing a contact charge method.

According to an aspect of the invention, a non-contact-contact power charge device includes a charge contact terminal including a charge output voltage pin, a ground pin, and a non-contact charge connection pin, the charge contact terminal being able to connect to a contact power receiver and a non-contact power transmitter; and a voltage controller configured to apply a non-contact voltage to the charge output voltage pin if the charge contact terminal is connected while the non-contact power transmitter is contacted to the non-contact charge connection pin.

According to an aspect of the invention, the voltage controller may be configured to control that a contact voltage is applied to the contact output voltage pin if the contact power receiver is contacted to the charge contact terminal without contacting the non-contact charge connecting pin.

According to an aspect of the invention, the device may further include: an indicator configured to show whether the contact voltage or the non-contact voltage is applied.

According to an aspect of the invention, the voltage controller may include: a variable resistor configured to apply any one of the contact voltage and the non-contact voltage to the charge output voltage pin based on the contact of the non-contact charge connection pin; and a regulator (LDO) configured to operate the variable resistor if the non-contact power transmitter is contacted to the non-contact charge connection pin.

According to an aspect of the invention, the charge contact terminal may include a data pin for receiving a charge status information from the non-contact transmitter, the charge status information produced in the non-contact receiver, and the voltage controller is configured to change the non-contact voltage based on the charge status information received via the data pin.

According to an aspect of the invention, the charge status information may include a full charge information, a voltage down information, and a voltage up information.

According to an aspect of the invention, the charge contact terminal may be any one of a 5-pin input-output terminal, an 18-pin input-output terminal, a 20-pin input-output terminal, and a universal serial bus (USB) terminal.

According to an aspect of the invention, a controlling method in a non-contact and contact power charge device includes contacting a power receiver to a charge contact terminal including a charge output voltage pin, a ground pin, and a non-contact charge connection pin; confirming whether the power receiver is a non-contact power transmitter or a contact power receiver, based on the contact of the non-contact charge connection pin; and applying a non-contact voltage to the charge output voltage pin if the power receiver is the non-contact power transmitter, and applying a contact voltage to the charge output voltage pin if the power receiver is the contact power receiver.

According to an aspect of the invention, the controlling method may further include the step of: showing whether the contact voltage or the non-contact voltage is applied via an indicator.

According to an aspect of the invention, the charge contact terminal may include a data pin for receiving a charge status information from the non-contact power receiver, and the controlling method may further include the steps of: receiving a charge status information of the non-contact power receiver via the data pin; and changing the non-contact or the contact based on the charge status information.

According to an aspect of the invention, the charge status information may include a full charge information, a voltage down information, and a voltage up information.

According to an aspect of the invention, the charge contact terminal may be any one of a 5-pin input-output terminal, an 18-pin input-output terminal, a 20-pin input-output terminal, and a universal serial bus (USB) terminal.

According to an aspect of the invention, the step of applying the non-contact voltage to the charge output voltage pin if the power receiver is the non-contact power transmitter, and applying the contact voltage to the charge output voltage pin if the power receiver is the contact power receiver may include the step of: changing the voltage applied to the charge output voltage pin via a variable resistor.

According to an aspect of the invention, a wireless power charging system may include: a contact power receiver configured to receive an external power source via a wire; a non-contact power transmitter configured to apply a power to a non-contact power receiver by means of an electro-magnetic method; and a non-contact-contact power charge device, may include: a charge contact terminal including a charge output voltage pin, a ground pin, and a non-contact charge connection pin, the charge contact terminal being able to connect the contact power receiver and a non-contact power transmitter; and a voltage controller configured to apply a non-contact voltage to the charge output voltage pin if the charge contact terminal is connected while the non-contact power transmitter is contacted to the non-contact charge connection pin.

According to an exemplary embodiment, it is possible to charge the charge pad, the battery pack or the mobile communication terminal as charge objects without regard to the contact method or the non-contact charge method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a non-contact-contact power charge device according to an exemplary embodiment and a controlling method thereof will be described in detail with reference to the accompanying drawings. The suffixes "module", "-er" and "-or" used in the detailed description are given to the constituent elements to take advantage of the ease in writing the description. The suffixes may be alternatively used and do not have a distinct difference or role in themselves.

Figure 1:
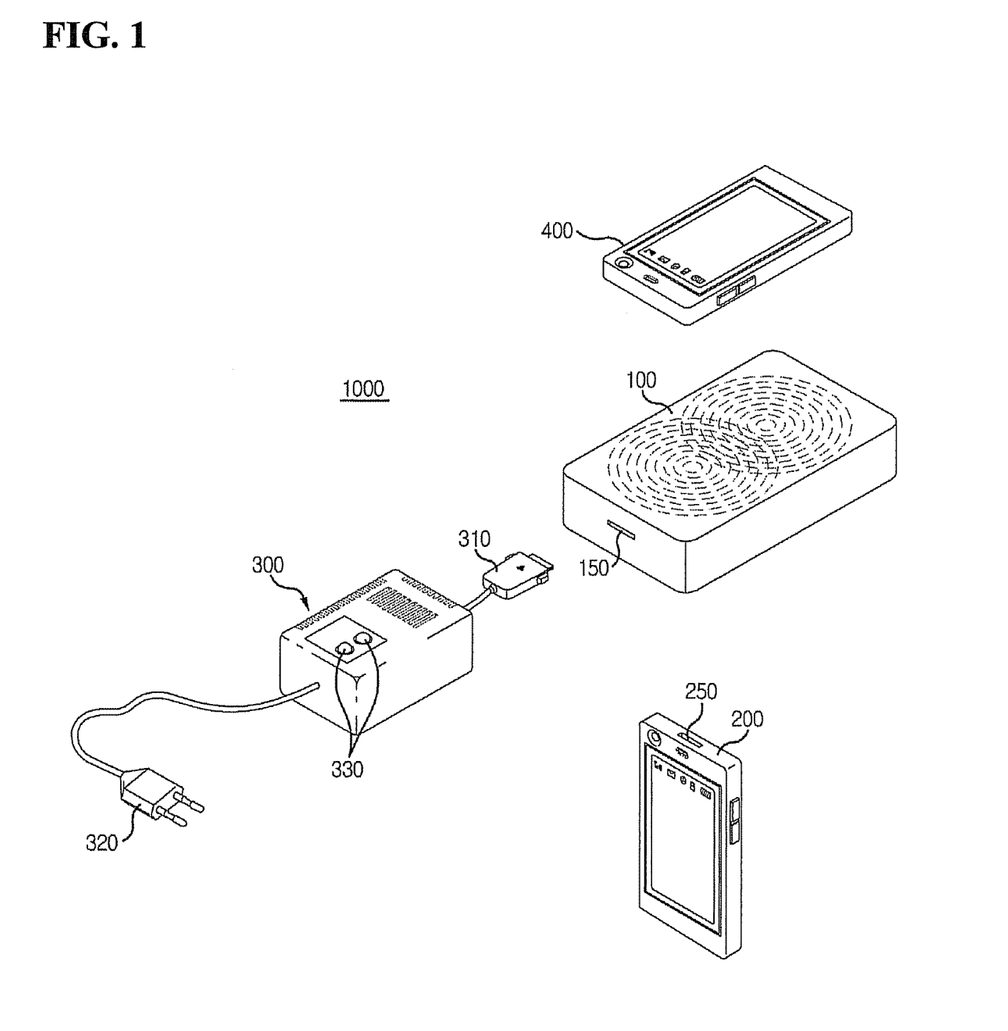
FIG. 1 is a conceptual view describing how a non-contact-contact power charge device is used according to an exemplary embodiment.

FIG. 1 is a conceptual view describing how a non-contact-contact power charge device is used according to an exemplary embodiment. As shown in FIG. 1, a wireless power charging system 1000 according to an exemplary embodiment includes a non-contact-contact power transmitter 100 as a non-contact charge pad, a mobile communication terminal 200 as a contact power receiver or a battery pack, to which a contact charge method is applied, and a non-contact-contact charge device 300.

Figure 2:
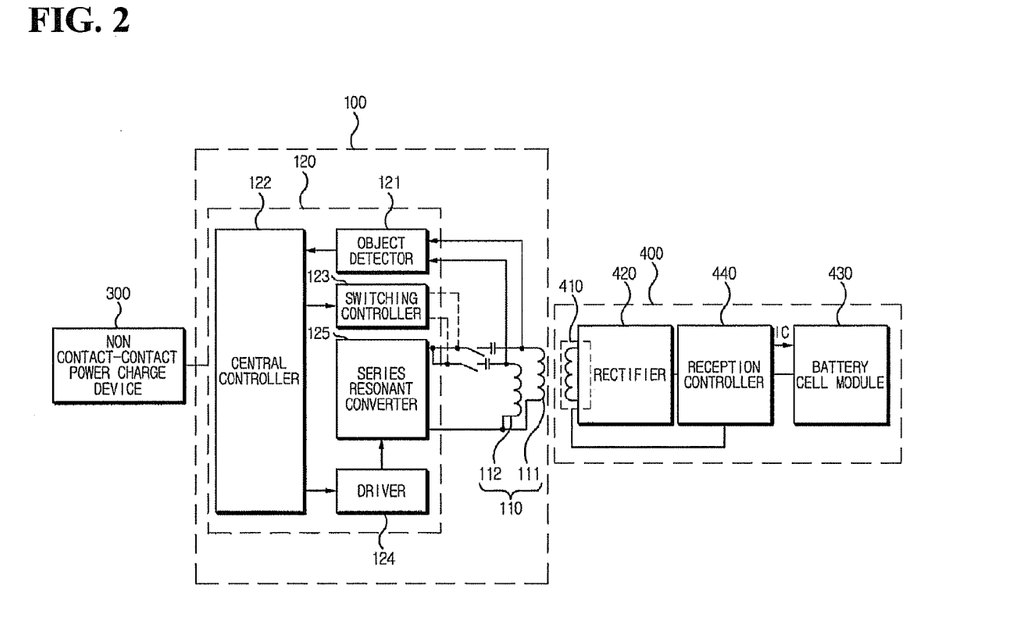
FIG. 2 is a block diagram showing a wireless power charging system according to an exemplary embodiment.

As shown in FIGS. 1 and 2, the non-contact power transmitter 100 transmits a wireless power signal to a wireless power receiver 400. While not required in all aspects, the transmission uses an electro-magnetic method or a short range wireless power transmission method to operate the wireless power receiver 400 or charge a battery cell module 430 included in the wireless power receiver 400.

The mobile communication terminal 200 acts as a contact power receiver and is a device that is charged or operated using the contact charge method. The mobile communication terminal 200 according to an exemplary embodiment receives power from the non-contact-contact power charge device 300 via a wire, although other mechanisms can be used to transmit the power to the communication terminal 200.

Figure 3A:
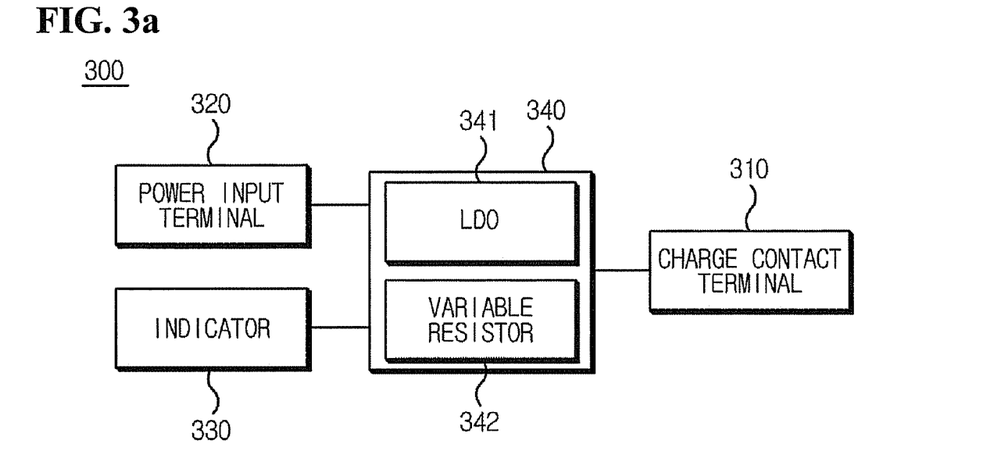
FIG. 3A is a block diagram showing a non-contact-contact power charge device according to an exemplary embodiment.

While not required in all aspects, the non-contact-contact power charge device 300 shown in FIGS. 1 and 3A includes a charge contact terminal 310, a power input terminal 320, an indicator 330 and a voltage controller 340. The non-contact-contact power charge device 300 confirms whether an external device contacted to the charge contact terminal 310 is the non-contact power transmitter 100 or the contact power receiver 200. The non-contact-contact power charge device 300 controls an output voltage based on a confirmed result. The non-contact-contact power charge device 300 will be described in detail with reference to FIG. 3.

According to an exemplary embodiment, it is possible to charge the charge pad, the battery pack or the mobile communication terminal as charge objects without regard to the contact method or the non-contact charge method.

Hereinafter, a wireless power charging system according to an exemplary embodiment will be described in detail with reference to FIG. 2. FIG. 2 is a block diagram showing the wireless power charging system according to an exemplary embodiment. As shown in FIG. 2, the wireless power charging system according to an exemplary embodiment includes the non-contact power transmitter 100, a contact power receiver 400, and the non-contact-contact power charge device 300. When the non-contact power transmitter 100 is connected to the non-contact-contact power charge device 300, the non-contact-contact power charge device 300 applies a non-contact voltage to the non-contact power transmitter 100. The non-contact power transmitter 100 transmits a wireless power signal to the wireless power receiver 400 using an electro-magnetic method using the non-contact voltage. When the non-contact power transmitter 100 transmits the wireless power signal, the wireless power receiver 400 receiving the wireless power signal charges the battery with the power of the wireless power signal or supplies power electronic devices connected to the wireless power receiver 400.

Hereinafter, each configuration of the exemplary non-contact power transmitter 100 and the wireless power receiver 400 will be described. The non-contact power transmitter 100 according to an exemplary embodiment includes a primary core 110 and a transmission controller 120. The primary core 110 includes a primary coil as a device for transmitting a power signal to a secondary core 410 of the wireless power receiver 400 using an electro-magnetic method. According to an exemplary embodiment, two coils including a first sub coil 111 and a second sub coil 112 may be applied. However, it is understood that multiple coils could be used, such as where multiple receivers 400 are used with the transmitter 100.

While not required in all aspects, the shown transmission controller 120 for controlling the primary core 110 includes an object detector 121, a central controller 122, a switching controller 123, a driver 124 and a series resonant converter 125. The object detector 121 detects a load change of the primary core 110, determines whether the load is changed by the wireless power receiving apparatus 400, and filters and processes a charging state signal transmitted from the wireless power receiving apparatus 400. In this way, the object detector 121 functions as an identification (ID) checker. That is, when an ID signal as a response signal to an ID call signal transmitted via the primary core 110 is received, the object detector 121 filters and processes the ID signal. When a charging state signal including information on a charging voltage or a battery cell during charging is received, the object detector 121 filters and processes the charging state signal.

The central controller 122 receives and checks a determination result of the object detector 121, analyzes an ID signal received in the primary core 110, and transmits a power signal for transmitting a wireless power signal via the primary core 110 to the driver 124. Also, a charging state signal is received from the primary core 110, the central controller 122 changes the wireless power signal by controlling the driver 124 based on the charging state signal. While not required in all aspects, the method performed by the central controller 122 can be implemented using software and/or firmware stored on a recording medium and which is implemented using one or more general or special purpose processors.

The switching controller 123 controls a switch to be between the first sub coil 111 and the second sub coil 112 and the series resonant converter 125. While shown with two sub coils, the invention is not limited thereto. By way of example, where one coil is used, the switching controller 123 is not required. Conversely, the controller 123 can control more than two coils in other embodiments.

The driver 124 controls the operation of the series resonant converter 125 according to the control of the central controller 122.

The series resonant converter 125 generates transmission power for generating a power signal to be transmitted by controlling the driver 124 and supplies the transmission power to the primary core 110. In other words, when the central controller 122 transmits the power controlling signal for transmitting a power signal with a required power value to the driver 124, the driver 124 controls the operation of the series resonant converter 125 correspondingly to the transmitted power controlling signal. Also, the series resonant converter 125 applies the transmission power corresponding to the required power value to the primary core 110 by controlling the driver 124 to transmit a wireless power signal with a required strength.

In addition, the series resonant converter 125 supplies power for generating a first object detecting signal and a second object detecting signal via each of the first sub coil 111 and the second sub coil 112 according to the control of the driver 124.

The shown embodiment of the wireless power receiving apparatus 400 includes a secondary core 410, a rectifier 420, a battery cell module 430 and a reception controller 440. The secondary core 410 generates the induction power by the transmitted power signal. The rectifier 420 rectifies the induced power. The battery cell module 430 is charged with the rectified power. The reception controller 440 controls the secondary core 410, the rectifier 420, and the battery cell module 430. While not required in all aspects, the method performed by the reception controller 440 can be implemented using software and/or firmware stored on a recording medium and which is implemented using one or more general or special purpose processors.

The secondary core 410 receives the wireless power signal transmitted from the primary core 110 of the wireless power transmission apparatus 100. The rectifier 420 the received wireless power received from the secondary core into a direct current (DC) voltage and maintains a charging state with a charging voltage before starting charging. The battery cell module 430 becomes an object to be charged with the DC power from the rectifier 420 under the control of the reception controller 240. While shown only with the battery cell module 430, the object to be charged may include additional electronic equipment, such as is used in a cellular phone, a portable gaming unit, a portable media player, and an MP3 player, a computer, a tablet or other like devices which utilize the battery cell module 430. The battery cell module 430 includes protection circuits such as a temperature detecting circuit, and over voltage and over current prevention circuits. The battery cell module 430 also includes a charging management module for collecting and processing information on a charging state of the battery cell. The reception controller 440 controls the current of power charged in the rectifier 420 such that proper current flows in the battery cell module 430.

Figure 3B:
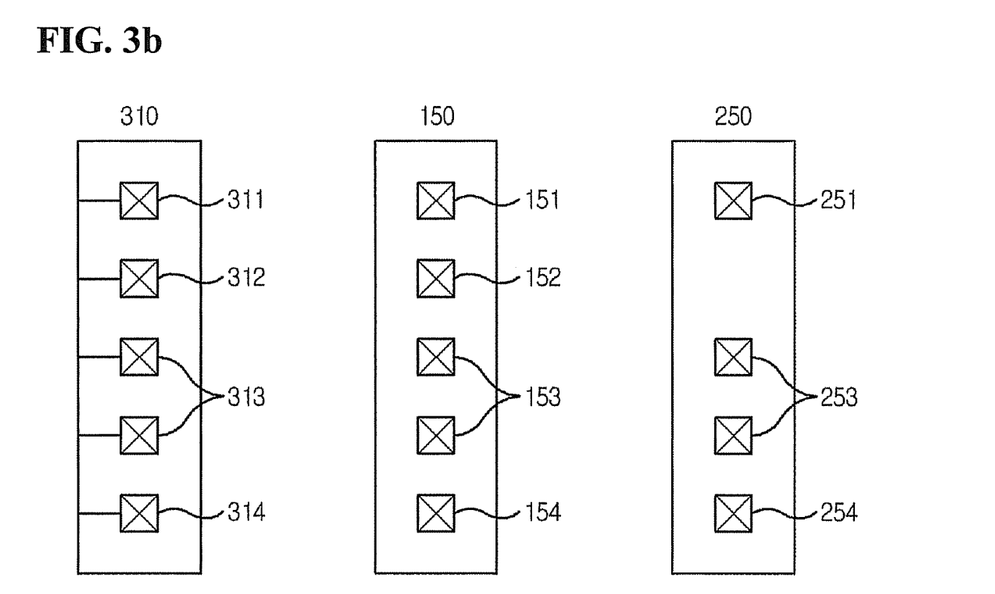
FIG. 3B is a diagram showing a detailed configuration and a contact aspect of a charge contact terminal applied to the non-contact-contact power charge device according to an exemplary embodiment.

A configuration and an operation of the non-contact-contact power charge device 300 will be described in detail with reference to FIGS. 1, 3A, 3B, and FIG. 4 in accordance with an embodiment of the invention. The non-contact-contact power charge device 300 confirms whether an external device contacted to the charge contact terminal 310 is the non-contact power transmitter 100 or the contact power receiver 200. The non-contact-contact power charge device 300 controls the output voltage based on a confirmed result. non-contact FIG. 3A is a block diagram showing the non-contact-contact power charge device 300 according to an exemplary embodiment. FIG. 3B is a diagram showing a detailed configuration and a contact aspect of a charge contact terminal 310 applied to the non-contact-contact power charge device 300 according to an exemplary embodiment.

While not required in all aspects, as shown in FIG. 3A, the non-contact-contact power charge device 300 includes the charge contact terminal 310, the power input terminal 320, the indicator 330, and the voltage controller 340. The charge contact terminal 310 is a constituent element that allows contact with both the non-contact power transmitter 100 and the contact power receiver 200. The charge contact terminal 310 includes a charge output voltage pin 311, a non-contact charge connection pin 312, a data pin 313 and a ground pin 314. The charge contact terminal 310 may be any one of a 5-pin input-output terminal, an 18-pin input-output terminal, a 20-pin input-output terminal, and a universal serial bus (USB) terminal. A configuration and a connection of the charge contact terminal 310 will be described in detail with reference to FIG. 3B.

The power input terminal 320 is a constituent element for contact of a 110V/220V commercial alternating current (AC) power. The AC power, which is input via the power input terminal 320, is changed into a proper voltage via the voltage controller 340 and a rectifier (not shown) of the non-contact-contact power charge device 300, and is applied to the non-contact power transmitter 100 or the contact power receiver 200. However, it is understood that other voltages can be used, and that the voltages need not be NC in all aspects, such as where the power is supplied from a battery or a solar panel.

The indicator 330 is a constituent element for showing a charging state of the non-contact-contact power charge device 300 by control of the voltage controller 340. The indicator 330 may be configured of a light emitting display such as a light emitting diode (LED). According to an exemplary embodiment, the indicator 330 may include a non-contact indicator and a contact indicator. The non-contact indicator is a constituent element that is turned on when the non-contact power transmitter 100 is contacted to the charge contact terminal 310 of the non-contact-contact power charge device 300. The contact indicator is a constituent element that is turned on when the contact power receiver 200 is contacted to the charge contact terminal 310 of the non-contact-contact power charge device 300. However, while described in terms of visible indications, it is understood that the indications can be provided in other manners, such as through audible signals or on the element being charged (i.e., wireless power receiver 400 or the contact power receiver 200). Moreover, it is understood that the indicator 330 is not required in all aspects.

As described above, the voltage controller 340 determines which one of the non-contact power transmitter 100 and the contact power receiver 200 is contacted to the charge contact terminal 310. The voltage controller 340 controls an output voltage based on a determined result. More specifically, when the non-contact power transmitter 100 is contacted to the charge contact terminal 310, a corresponding pin of the non-contact power transmitter 100 is contacted to the non-contact charge connection pin 312. The voltage controller 340 detects the contact of the pin and controls such that a non-contact voltage is applied to the charge output voltage pin 311. When the contact power receiver 200 is contacted to the charge contact terminal 310, the contact power receiver 200 is not contacted to the non-contact charge connection pin 312. Accordingly, the voltage controller 340 may control that a contact voltage is applied to the charge output voltage pin 311.

While not required in all aspects, the voltage controller 340 includes a regulator (low drop out :LDO) 341 and a variable resistor (potential meter) 342. The variable resistor 342 plays a role of applying any one of the contact voltage and the non-contact voltage to the charge output voltage pin 311 based on the contact of the non-contact charge connection pin 312. The regulator 341 plays a role of supplying power for operating the variable resistor 342 when the contact power receiver 200 or the non-contact power transmitter 100 is contacted to the non-contact charge connection pin 312.

Hereinafter, the charge contact terminal will be described with reference to FIG. 3B. As shown in FIG. 3B, the charge contact terminal 310 includes the charge output voltage pin 311, the non-contact charge connection pin (an NC pin) 312, the data pin 313 and the ground pin 314. A charge contact terminal 150 of the non-contact power transmitter 100 includes a charge voltage reception pin 151, an NC pin 152, a data pin 153, and a ground pin 154. A charge contact terminal 250 of the contact power receiver 200 includes a charge voltage reception pin 251, a data pin 253, and a ground pin 254 but does not include a pin corresponding to the NC pin 312.

Accordingly, when the charge contact terminal 310 is connected to the non-contact power transmitter 100, the NC pin 312 is contacted. However, when the charge contact terminal 310 is connected to the contact power receiver 200, the NC pin 312 is opened. The voltage controller 340 senses the contact of the non-contact power transmitter 100 or the contact power receiver 200 and determines which one of the non-contact voltage and the contact voltage is to be applied. However, it is understood that, in order embodiments, pin configuration can be different such that the NC pin 312 is opened when in contact with the non-contact power transmitter 100 but is closed when in contact with the contact power receiver 200.

Figure 4:
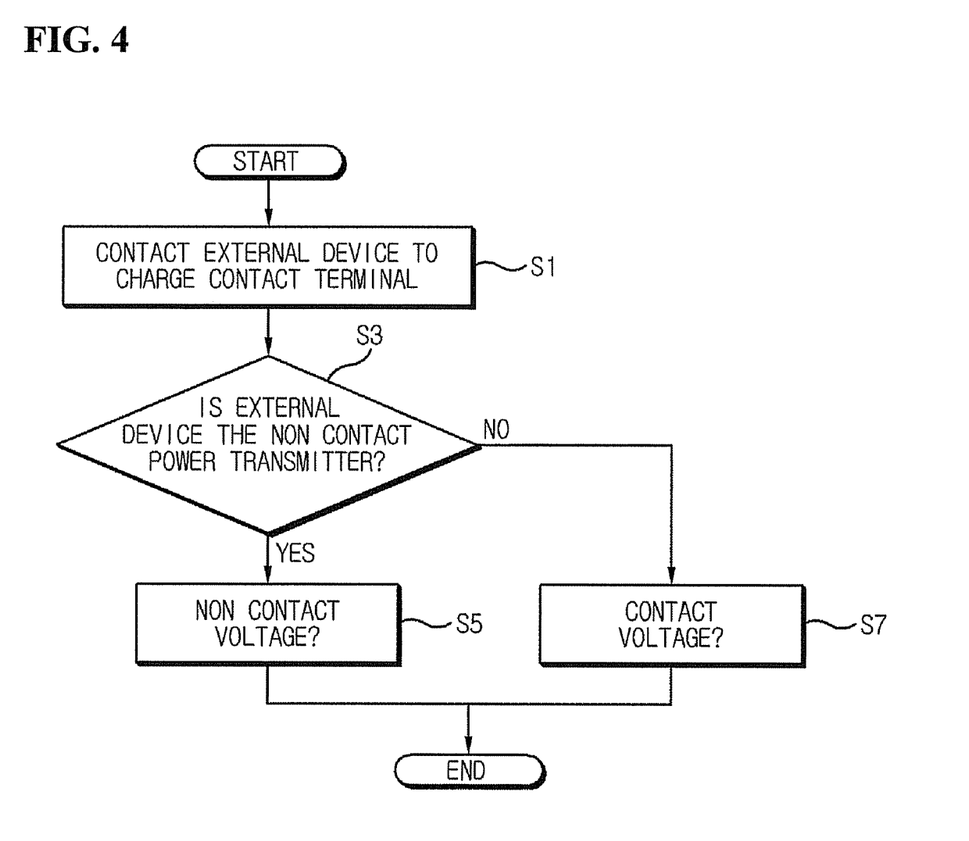
FIG. 4 is a flowchart describing a controlling method of a non-contact-contact power charge device according to an exemplary embodiment.

Hereinafter, a voltage application controlling method of the non-contact-contact power charge device with the configuration described above will be described in detail with reference to FIG. 4. FIG. 4 is a flowchart describing the controlling method of the non-contact-contact power charge device according to an exemplary embodiment. As described in FIG. 4, an external device is contacted to the charge contact terminal 310 at step S1. As described above, the charge contact terminal 310 includes the charge output voltage pin 311, the non-contact charge connection pin 312, the data pin 313 and the ground pin 314. It is detected at step 53 whether the power receiver as the external device is the non-contact power transmitter 100 based on the contact of the non-contact charge connection pin 312 in the charge contact terminal 310. If the power receiver is the non-contact power transmitter 100, the non-contact voltage is applied to the charge output voltage pin 311 at step S5. If the power receiver is the contact power receiver 200, the contact voltage is applied to the charge voltage pin 311 at step S7. To be specific, the voltage applied to the charge output voltage pin 311 is changed by the variable resistor 342.

A step of showing whether the contact voltage or the non-contact voltage is applied via the indicator 330 of the non-contact-contact power charge device 300 may be further included. Since it is described in detail above with reference to FIG. 1 to FIG. 3, detailed description regarding this matter will not be provided herein.

When a power transmission begins, a step that the non-contact-contact power charge device receives a charge status information via the data pin and changes the non-contact voltage based on the charge status information may be further included.

The charge status information may include a full charge information, a voltage down information, and a voltage up information. The non-contact-contact power charge device receiving the charge status information controls the output voltage based on the charge status information, thereby obtaining the superior power transmission efficiency.

According to an exemplary embodiment, it is possible to charge the charge pad, the battery pack or the mobile communication terminal as charge objects without regard to the contact method or the non-contact charge method.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-contact-contact power charge device for use with a contact power receiver and a non-contact power transmitter, comprising:

a charge contact terminal including a charge output voltage pin, a ground pin, and a non- contact charge connection pin, the charge contact terminal being able to connect to the contact power receiver and the non-contact power transmitter; and a voltage controller configured to apply a non-contact voltage to the charge output voltage pin when the charge contact terminal is connected while the non-contact power transmitter is contacted to the non-contact charge connection pin, wherein the voltage controller is configured to control that a contact voltage is applied to the contact output voltage pin when the contact power receiver is contacted to the charge contact terminal without contacting the non-contact charge connecting pin wherein the voltage controller comprises: a variable resistor configured to apply a selected one of the contact voltage and the non- contact voltage to the charge output voltage pin based on the contact of the non-contact charge connection pin; and a regulator configured to operate the variable resistor when the non-contact-contact power transmitter is contacted to the non-contact-contact charge connection pin.

2. The device of claim 1, further comprising:
an indicator configured to show whether the contact voltage or the non-contact voltage is applied.

3. The device of claim 1, wherein:
the charge contact terminal includes a data pin for receiving a charge status information from the non-contact transmitter, the charge status information produced in the non-contact receiver, and
the voltage controller is configured to change the non-contact voltage based on the charge status information received via the data pin.

4. The device of claim 3, wherein the charge status information includes a full charge information, a voltage down information, and a voltage up information.

5. The device of claim 1, wherein the charge contact terminal a 5-pin input-output terminal, an 18-pin input-output terminal, a 20-pin input-output terminal, or a universal serial bus (USB) terminal.

6. A controlling method in a non-contact and contact power charge device, the controlling method comprising:
confirming, by using the non-contact and contact power charge device, whether the power receiver is a non-contact power transmitter or a contact power receiver, based on the contact of the non-contact charge connection pin;
applying, by using the non-contact and contact power charge device, a non-contact voltage to the charge output voltage pin when the power receiver is the non-contact power transmitter; and
applying, by using the non-contact and contact power charge device, a contact voltage to the charge output voltage pin when the power receiver is the contact power receiver
wherein the controlling method is implemented when a power receiver contacts a charge contact terminal including a charge output voltage pin, a ground pin, and a non-contact charge connection pin,
wherein the voltage controller is configured to control that a contact voltage is applied to the contact output voltage pin when the contact power receiver is contacted to the charge contact terminal without contacting the non-contact charge connecting pin,
wherein the voltage controller comprises: a variable resistor configured to apply a selected one of the contact voltage and the non- contact voltage to the charge output voltage pin based on the contact of the non-contact charge connection pin; and
a regulator configured to operate the variable resistor when the non-contact-contact power transmitter is contacted to the non-contact-contact charge connection pin.

7. The controlling method of claim 6, further comprising the step of:

Showing, by using the non-contact and contact power charge device, whether the contact voltage or the non-contact voltage is applied via an indicator.

8. The controlling method of claim 6, wherein:
the charge contact terminal comprises a data pin for receiving a charge status information from the non-contact power receiver, and
the controlling method further comprises:
receiving, by using the non-contact and contact power charge device, a charge status information of the non-contact power receiver via the data pin; and
changing, by using the non-contact and contact power charge device, the non-contact or the contact based on the charge status information.

9. The controlling method of claim 8, wherein the charge status information includes a full charge information, a voltage down information, and a voltage up information.

10. The controlling method of claim 6, wherein the charge contact terminal is a 5-pin input-output terminal, an 18-pin input-output terminal, a 20-pin input-output terminal, or a universal serial bus (USB) terminal.

11. The controlling method of claim 6, wherein the applying the non-contact voltage to the charge output voltage pin when the power receiver is the non-contact power transmitter, and the applying the contact voltage to the charge output voltage pin when the power receiver is the contact power receiver comprises:
changing, by using the non-contact and contact power charge device, the voltage applied to the charge output voltage pin via a variable resistor.

12. A wireless power charging system, comprising:
a contact power receiver configured to receive an external power source via a wire;
a non-contact power transmitter configured to apply a power to a non-contact power receiver using an electromagnetic method; and
a non-contact-contact power charge device, comprising:
a charge contact terminal including a charge output voltage pin, a ground pin, and a non-contact charge connection pin, the charge contact terminal being connectable to the contact power receiver and a non-contact power transmitter; and
a voltage controller configured to apply a non-contact voltage to the charge output voltage pin when the charge contact terminal is connected while the non-contact power transmitter is contacted to the non-contact charge connection pin,
wherein the voltage controller is configured to control that a contact voltage is applied to the contact output voltage pin when the contact power receiver is contacted to the charge contact terminal without contacting the non-contact charge connecting pin
wherein the voltage controller comprises: a variable resistor configured to apply a selected one of the contact voltage and the non- contact voltage to the charge output voltage pin based on the contact of the non-contact charge connection pin; and
a regulator configured to operate the variable resistor when the non-contact-contact power transmitter is contacted to the non-contact-contact charge connection pin.

13. The system of claim 12, further comprising:
an indicator configured to show whether the contact voltage or the non-contact voltage is applied.

14. The system of claim 12, wherein:
the charge contact terminal includes a data pin for receiving a charge status information from the non-contact transmitter, the charge status information produced in the non-contact receiver, and the voltage controller is configured to change the non-contact voltage based on the charge status information received via the data pin.

15. The system of claim 14, wherein the charge status information includes a full charge information, a voltage down information, and a voltage up information.

16. The system of claim 12, wherein the charge contact terminal is a 5-pin input-output terminal, an 18-pin input-output terminal, a 20-pin input-output terminal, or a universal serial bus (USB) terminal.

* * * * *